Jan. 29, 1946.  D. C. HUBBARD  2,393,635
ICE REMOVING DEVICE FOR AIRCRAFT
Filed April 17, 1942  3 Sheets-Sheet 1
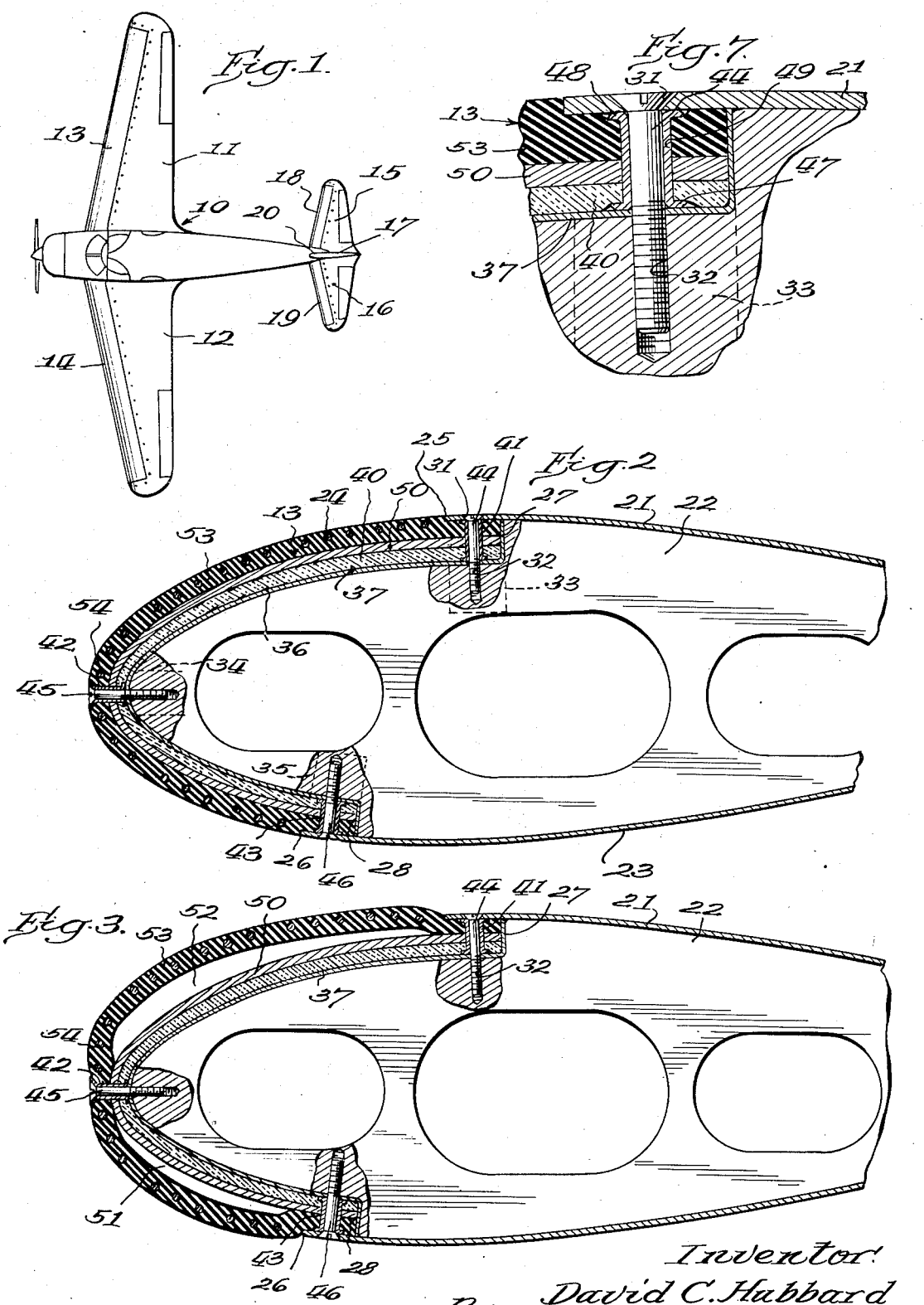

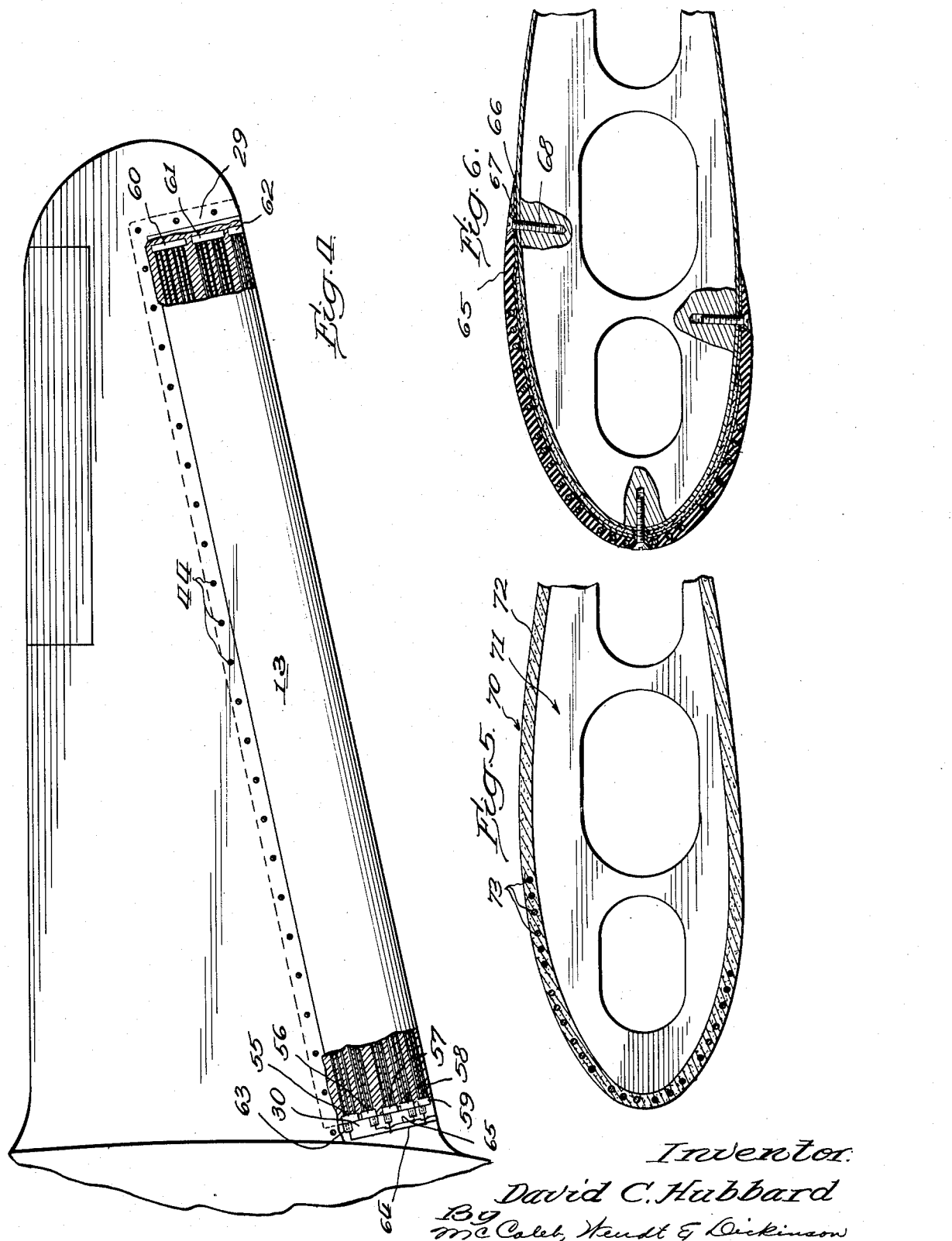

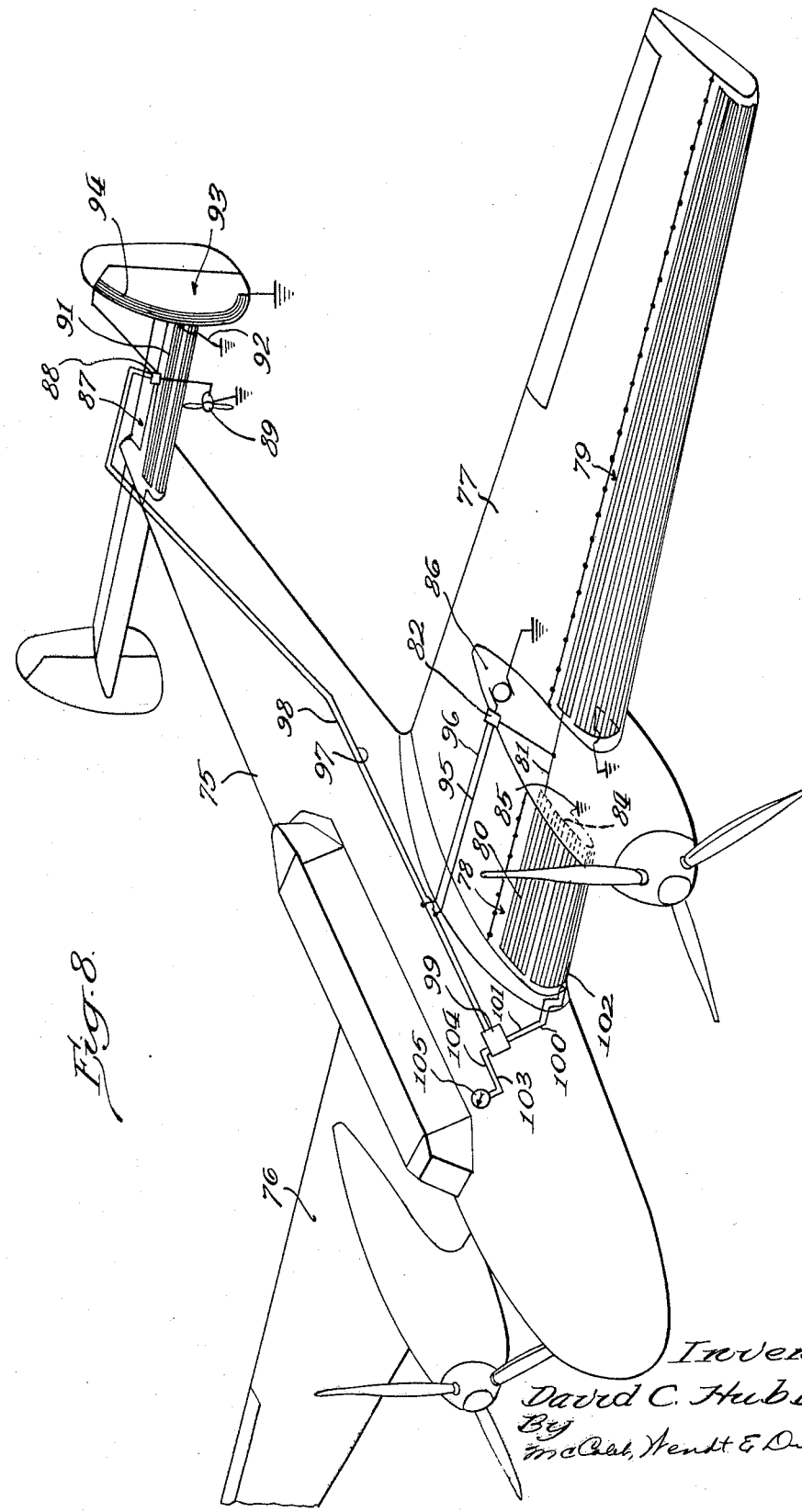

Patented Jan. 29, 1946

2,393,635

UNITED STATES PATENT OFFICE 2,393,635

ICE REMOVING DEVICE FOR AIRCRAFT

David C. Hubbard, Centralia, Mo., assignor of fifty per cent to Robert H. Wendt, Chicago, Ill.

Application April 17, 1942, Serial No. 439,304

11 Claims. (Cl. 244—134)

The present invention relates to devices for removing ice from aircraft, and is particularly concerned with the removal of ice from the leading surfaces of wings, empennage, or tail parts, but may also be applicable to the fuselage, and even to propeller surfaces.

It is indicated by recent airplane accidents that the provisions for removal of ice or prevention of the formation of ice on aircraft in modern airplanes is insufficient, as ice has formed on the essential surfaces of wing and tail parts of the devices now in use, even though they are provided with flexible rubber boots of the prior art.

One of the objects of the invention is the provision of an improved device for preventing the formation of ice or effecting its removal, which utilizes both heat and force for breaking up the ice formations.

Another object of the invention is the provision of an improved device for preventing formation of ice or effecting its removal which would not become inoperative when pierced by bullets and which would still provide for the effective de-icing even though some of its heating elements might be severed by action of bullets or other military action.

Another object of the invention is the provision of an improved flexible aircraft boot for preventing ice formations, which is adapted to utilize the application of heat in such manner that there is a wide factor of safety in the provision of the ice removal apparatus and so that the present devices may be depended on to remove the ice under all conditions for which the device is designed.

Another object of the invention is the provision of an improved device for removing ice from the surfaces of aircraft, which includes electrical heaters, and which has the heaters so disposed that they do not interfere with or prevent the distention of a flexible and extensible boot of rubber or the like.

Another object of the invention is the provision of an improved device for removing ice, by means of which heat may be applied most economically and at the exact point where it is most effective so as to cooperate with the breaking action of a flexible and extensible boot by decreasing the adhesion between the ice and the boot by melting the ice at its point of attachment to the boot.

Another object of the invention is the provision of an improved device for ice prevention or removal, which is adapted to be conveniently installed as a unit in any modern airplane, and which may be installed either in planes which have been provided with a recess for the device, or upon other planes not particularly designed to receive it.

Another object of the invention is the provision of an improved de-icer for aircraft, which is simple, effective, sturdy, capable of economical manufacture, adapted to be controlled manually, or automatically, and adapted to be provided with indicating devices for indicating to the operator the condition of the wing surfaces at all times.

Another object of the invention is the provision of an improved de-icer which is safe against fire hazard, and which combines the action of expanding and contracting de-icing surfaces with the use of heat for raising the temperature of the surface to reduce the rate of ice formation under severe conditions in order that the ice may be effectively broken up under all conditions.

Another object of the invention is the provision of an improved de-icer having separately controllable and operable arrangements for removing ice and preventing its formation so that if, for some reason, one may fail to function, the other may serve in an emergency to accomplish the result until a landing can be made and repairs effected.

Another object of the invention is the provision of an improved de-icer which is adapted to be applied to airplanes of the type having parts that are made of a molded plastic.

Another object of the invention is the provision of an improved de-icer for aircraft, which is adapted to be made in such form that it is readily demountable so that it may be removed and replaced, if damaged or worn out.

Another object of the invention is the provision of an improved de-icer for aircraft employing heat for effecting de-icing which is provided with an air insulating chamber for insulating the heated portion of the device from the rest of the device or plane.

Referring to the three sheets of drawings accompanying this specification:

Fig. 1 is a top plan view of an airplane equipped with devices for preventing formation of ice on the leading edges of the wings and tail surfaces;

Fig. 2 is a fragmentary sectional view of a wing surface having a recess at its leading edge for receiving the devices embodying the invention, showing the boot in contracted position;

Fig. 3 is a view similar to Fig. 2, showing the boot in expanded or partially expanded position;

Fig. 4 is a fragmentary top plan view of a wing surface equipped with the invention, partially broken away to show the structure of the de-icer;

Fig. 5 is a fragmentary sectional view of the wing of a plane, made of molded plastic, which is equipped with a de-icing arrangement embodying another form of the invention;

Fig. 6 is a view similar to Fig. 2 of a modified form of the invention, showing its construction when it is removably applied to planes not having a recess in the wing surface for it;

Fig. 7 is a fragmentary sectional view, taken through one of the fastening devices, for securing the boot of Figs. 2 and 3 to the plane;

Fig. 8 is a wiring diagram showing the circuits embodying the invention shown in connection with an airplane.

Referring to Fig. 1, 10 indicates in its entirety one type of aircraft which may be equipped with devices embodying the invention.

In this embodiment of the invention the devices for preventing accumulation of ice have been applied to the leading edges of the wings 11 and 12, and have been indicated by the numerals 13, 14. In addition, the de-icing devices are applied to the leading surfaces of the tail structure, such as the horizontal stabilizers 15, 16 and the vertical stabilizer 17.

The latter devices are indicated by the numeral 18, 19, and 20.

It is, of course, to be understood that in each of these cases the size of the device is suitable for the size of the wing or tail surface on which it is employed, and the extent or area covered depends on the extent of the airplane surface, which customarily tends to accumulate ice.

Thus, on the wing and horizontal stabilizing surfaces the members 13, 14 and 18, 19 preferably extend farther back on the top of these surfaces than they do on the bottom because it is well known that there is a greater tendency for the ice to accumulate farther back on the top than there is on the bottom.

It is understood that the present devices may be made of any shape so that they can be applied to any or all of the surfaces of the airplane, such as the fuselage or other surfaces where it becomes necessary or desirable to prevent the accumulation of ice.

The present devices are preferably made conveniently detachable and secured by means of threaded or other securing devices which have their heads flush with the outer surface of the plane so that no obstructions are presented to the flow of air by the fastening devices.

The de-icers may be embodied in detachable forms adapted to be received in a recess in the airplane surface in question, as in Figs. 2 to 4, or they may be superimposed upon the outer surface of an existing plane, as shown in Fig. 6.

The former arrangement is, of course, preferable because it maintains the proper curvature of the leading edge of the wing or other airplane surface, at least when the de-icer is not inflated.

While the latter arrangement of Fig. 6 changes the size and shape of the wing section at its leading edge somewhat, considerations of safety from ice accumulation should outweigh any disadvantages resulting from the external application of the relatively thin device to existing planes.

In the embodiment of Fig. 5, this is a modification which does not employ pneumatic means for supplementing the action of heat in preventing accumulation of ice.

Referring to Fig. 2, the airplane wing structure illustrated here is merely exemplary of one form of structure to which the invention may be applied. 21 indicates the upper metal skin of the airplane. 22 indicates one of the transverse frame members to which it is secured, and 23 the lower metal skin of the wing.

The frame members of the wing are preferably cut away at the leading edge of the wing to form a recess for the boot 13, which embodies the invention in Fig. 2 in such manner that when the boot is collapsed the external surface of the boot forms a continuation of the surface of the wing, which is flush with the metal outside of the metal skin 25 at the juncture 25 and flush also with the outside of the metal skin 23 at the juncture 26.

The external surface 24 of the boot 13 is preferably curved to the desired contour of the wing when it is in the position of Fig. 2 because that is the position which it will assume most of the time, since the de-icer is only used under special conditions.

The metal skin 21 of the wing is extended beyond boundaries of the recess, that is, beyond the shoulder 27 (Fig. 2) at the top and beyond the shoulder 28 (Fig. 2) at the bottom. In the same way the metal skin of the airplane may project over the recess at each end of the boot, as, for example, at 29 (Fig. 4) above the wing and also below the wing.

At the other end 30 there is a similar over-hanging portion of sheet metal covering the boot. These over-hanging flanges of the metal skin of the wing are provided with countersunk apertures 31 regularly spaced from each other and registering with the threaded bores 32 in the transverse frame members 22 of the wing or special longitudinally extending frame members of the wing extending between the transverse frame members 22. Such a longitudinally extending frame member is indicated in dotted lines at 33, 34, or 35.

The transverse frame members 22 of the wing are cut away, as indicated at 36, to provide such a shape that they may support the boot 13 in the position shown in Fig. 2, and these frame members are preferably covered at the part 36 and shoulder 27 with an auxiliary layer of sheet metal 37 secured to the transverse and longitudinally extending frame members of the wing, in the same manner as the skin 21 or 23.

In addition to the layer of sheet metal 37 covering the frame members of the wing or other member in the recess for the boot or heating member, the sheet metal skin 27 is preferably covered with a layer of heat insulation 40, which may consist of a woven fabric of asbestos fibers, which is also adapted to serve as a fireproofing layer in the case where the plane is made of inflammable material, such as wood, covered with fabric, or if it is made of plywood.

The heat insulating and fire resistive layer 40 may form a part of the boot, or it may be separately applied to the wing or other member. In the embodiment of Fig. 2 it forms a part of the boot, being secured thereto by a plurality of tubular rivets 41, 42, 43, which also serve to receive the threaded bolts 44, 45, 46 that secure the boot to the wing.

These tubular rivets are shown in detail in Fig. 7, and they comprise tubular metal members, the outer ends of which are spun over at 47 and 48 at each end to form an annular flange which overlies and compresses and secures the parts of the boot together.

The tubular rivets pass through apertures 49, which may be punched in the boot at regularly spaced intervals along each of its edges, and also at a medial point, which is preferably at the leading edge of the wing or other member.

In some embodiments of the invention the boot may consist solely of a heating member, which is applied to the wing or other part of the plane for the purpose of producing heat at the surface which supports the ice; but in the preferred embodiment of the invention the boot preferably includes both the structures for heating and melting the ice at the surface and for applying a breaking force to it.

The next layer 50 of the boot 13 may consist of a layer of thin flexible rubber, forming one of the walls of a pair of chambers 51, 52 in the de-icer. The rubber wall 50 extends from the shoulder 27 around and over the front of the wing or other member to the shoulder 28, completely covering the asbestos insulating layer 40 when one is used.

The next or outer layer of the de-icing device 13 comprises a resilient stretchable and flexible layer or sheet 53 of rubber, such as a pure Pará rubber, or some synthetic substitute having the same characteristics, which is adapted to cover completely the rest of the boot and to form a flexible and stretchable outer wall of the boot.

This sheet also preferably extends from the shoulder 27 to the shoulder 28 around the leading surface of the wing or other member, and it is provided also with the registering apertures 49, which receive the tubular rivets 41, 42, and 43. The tubular rivets 41 and 43 along the edges preferably have their flanges 47, 48 both extending outward at the right angles to the axis of the rivet, and the aperture 31 in the metal skin 21 of the wing is countersunk to receive the countersunk head of the screw bolts 44 or 46.

At the leading edge of the boot, however, the rivet 42 may have its outer flanges formed to provide the countersunk aperture for the head of the screw bolt so that the screw bolt will have its head flush with the outer surface of the boot.

The flexible and stretchable layer 53 of the boot is provided with a multiplicity of heating elements 54, which are so arranged that they do not interfere with the stretchable quality or characteristic of the layer 53 in the direction in which it is designed to stretch.

Referring to Fig. 3, it will be noted that the layer 53 stretches outward and is elongated in its lateral dimension so as to form the chambers 51, 52 in the boot.

The heating elements 54 do not in any way hamper this stretching action across the width of the strip 53 because the heating elements are arranged to extend longitudinally of the layer 53, and the stretching may take place between the respective heating elements 54.

The heating elements 54 preferably comprise wires of suitable metal, such as copper wires of suitable size with respect to the voltage employed, so as to pass a heating current which will heat the outer surface 24 of the boot without damaging it.

For example, I have found in one embodiment that a current of six amperes passing through the entire boot was adequate to heat the outer surface to a temperature of approximately ninety-five degrees F.

Thus the heating elements 54 may consist of relatively fine copper wires which are embedded in the rubber sheet 53 either by molding the rubber around the wires or by placing the wires between the two sheets and vulcanizing them together.

At each of the ends of the heating element 54 the wires are preferably secured together in groups by being secured to connectors 55 to 62, which comprise copper strips to which the wires are soldered.

The wires may be arranged in groups of three or any other convenient number, as shown in Fig. 4; and each of the connector strips 55 to 59 are preferably arranged with connector prongs adapted to be engaged in connector sockets 63 carried by the framework of the wing beneath the skin 30.

The connectors 55, 57, 59, for example, may be connected in parallel to a conductor 64, while the connectors 56 and 58 may be connected in parallel to a conductor 65. Thus the current may come in at the conductor 64 and pass through the wires which are carried by connectors 55, 57, 59 to connectors 60 and 61.

Connectors 60, 61 join together six wires in each case so that the current passes along the boot in three wires through the connector 60 and back in the next three wires. Of course, the arrangement shown in Fig. 4 is only that on one side of the wing, and all of the resistance elements or heating wires 54 may be arranged in a similar manner.

The heating elements 54 are preferably arranged as close as possible to the outer surface 24 of the boot 13 so as to locate the heat at the point of engagement of the ice with the boot or surface of the plane.

The rubber sheet or sheets 53 serve as insulating supports for the wires to insulate and space them from each other and to protect them from abrasion or damage. The extension of the rubber wall 53 longitudinally of the wing is prevented by the tensile strength of the wires 54, but the stretching of the rubber wall in a direction transversely to its length is not hindered in any way by the wires.

The entire boot is removable by removing the screws which secure it in its recess and by pulling out the connection plugs from the sockets which are carried by the framework of the plane adjacent the fuselage. Thus a boot may be replaced with a minimum amount of difficulty.

Referring to Fig. 3, this is a view showing the extension of the boot by the application of air or other gas under pressure, and this gas under pressure is preferably applied periodically so that the boot is distended and contracted periodically. The boot being secured to the leading edge of the wing or other member by the bolt 45, this causes the space between the walls to be separated into two chambers 51, 52, and produces a definite line of cleavage along the leading edge of the wing at the bolts 45.

Thus the boot is distended on both sides, but held in at the leading edge of the wing, which produces a definite cracking action at that point. The heating elements produce heat at the surface of the boot, where the ice is carried, and the ice immediately adjacent to the rubber is melted, thus producing a separation between the ice and the boot immediately at the surface of the boot.

This separation or cleavage between the ice and the boot facilitates the release of the ice from the boot when the boot expands. As the surface of the boot slides along the surface of the ice during this expansion and cracks are produced along the leading edge of the wing, the ice tends to break off in a plurality of pieces, some of them breaking off above and others below.

The walls 53 and 50 may be cemented or vulcanized together at each of the edges of the boot, that is, along those portions which are secured together also by the tubular rivets 41 and 43, and suitable flexible rubber hose connections may be made at any desired point, preferably at the left end of the foot in Fig. 4, for the application of the air pressure.

The securement of the edges of the boot together adjacent the shoulders 27 and 28 at each end of the boot causes the walls 53 and 50 to form the two closed chambers 51 and 52 for distention by means of the application of gas.

The wall 50 may be reinforced by means of the use of a fabric embedded in the rubber, thus reducing the amount of rubber which need be used in this wall of the boot.

Referring to Fig. 6, this is a modification which is intended to be applied to the surfaces of existing airplanes which do not have recesses particularly formed to receive the boot. In this case the boot is of the same construction except that its edges are tapered from the point 65 to the extreme edge 66, and the tubular rivets 67 for receiving the screw bolts 68 are necessarily shorter.

In this case the boot causes the shape of the airfoil to diverge from that for which the plane was originally designed, but only slightly, as the boot may be made relatively thin.

Referring to Fig. 5, this is a modification showing a plane which has a wing or other element 70 molded of plastic or plywood or cast out of light metal, such as aluminum or magnesium, the main structural parts being the transverse frame members 71 and the skin 72.

In the case where an insulating product is used, bare copper wires 73 may be embedded in the skin 72 of the wing adjacent the outer surface thereof and adjacent the leading surfaces, as illustrated. Where the material is not of electrical insulating properties, the wires 73 may be covered with insulation.

I desire it to be understood that the sections of the heating elements in the boot may be connected in parallel or series, and suitable switches may be provided to change the connection from parallel to series so as to increase the heating effect in any particular sections desired or increase the local heating effect to melt the ice wherever necessary.

Thus the output at any of the heating elements may be increased for a short period.

Furthermore, my system includes the use of thermocouples embedded in the boot and connected to suitable amplifying circuits and measuring devices calibrated in terms of temperature so that the temperature at predetermined points in the boot or at the boot surface may be determined by the operator of the plane at any time.

The thermocouples may control suitable relays through amplifying devices so that if the temperature drops below a predetermined point the current in the heating elements of the boot is automatically turned on and the devices which produce the periodic air pressure inside the boot are also automatically turned on.

Either the intermittent distention of the boot by air pressure and/or the electric heating arrangement may be used separately, and the other one of these arrangements may be held in reserve as an emergency measure to be employed whenever necessary so as to be absolutely sure that the de-icing will be effected under the most adverse conditions.

The intermittent air pressure may be supplied by a motor or propeller driven air pump, the output of which is controlled by solenoid actuated valves leading to the various boots. The electric current may be provided by means of a suitable propeller driven generator.

Referring to Fig. 8, this is a diagrammatic illustration of an airplane, shown in perspective in connection with the wiring diagram of my de-icing arrangement. In this case the fuselage is indicated by the numeral 75 and the wings by 76, 77. As this happens to be a bi-motor plane, the de-icers for each wing are made in the form of the short section 78 and the relatively long section 79.

The electric heating elements 80 of the boot 78 are connected together in parallel groups of four. Thus the first group is connected to the conductor 81, which leads to a relay operated switch 82. The opposite end of the four heating elements is connected by a conductor 83 to the next four heating elements, and the right end of these four heating elements is connected by conductor 84 to the next four heating elements, and so on.

The last group of four heating elements in this boot is connected to conductor 85, which is grounded on the plane. Of course, it should be understood that a two wire system or a grounded system may be employed in any case.

The energization current for the boots 78 and 79 may be supplied by the generator 86, which may be driven either by the motor or an air propeller, the application of the current to the boots being controlled by means of the relay operated switch 82, which also controls by means of solenoids the opening or closing of air valves to effect a distention of the boot.

At the rear end of the fuselage there is illustrated an additional boot 87, which has its sections controlled by a relay operated switch 88 for controlling the application of energizing current, which may be produced by the propeller driven generator 89.

The generator is grounded at 90, and one of the terminals of the heating elements 91 of the boot is grounded at 92. One of the leading surfaces of the rudder arrangements is shown to be provided with another boot 93 in which the heating elements 94 are concentrically arranged and equally spaced from each other in curved lines adjacent the leading surface of the boot. These de-icers at the empennage may be connected in parallel.

The relay operated switches 82 and 88 are connected by pairs of conductors 95, 96, 97, 98 to each other and to the output of an automatic and manual control 99, which includes an amplifier that is connected by conductors 100, 101 to the thermocouple 102 located at the leading edge of the boot.

Any number of thermocouples may be provided so that the temperature may be determined at any point in the boot and at any location on the wing surface to which the boot is applied.

The conductors 103, 104 lead from the automatic and manual control and amplifier to the icing indicator 105, which may consist of an electric meter calibrated in terms of temperature so as to indicate the necessity for the use of the de-icer.

I desire it to be understood that the electric heating elements of the boot may be made of any desired metal or alloy suitable for such heating elements and of such size as to produce the desired amount of heat, when energized by the generators with which they are designed to operate.

On unusually large or long wings the de-icers may be in two or more electrical sections, if necessary, and each section may be separately heated by means of a separate small generator.

The use of different generators for different sections increases the factor of safety, as it is unlikely that all of the generators could become inoperative at the same time. By means of alternative connections in the manual control the generators, which are operating satisfactorily, may have their output divided among the various heating element sections of the boots so as to produce a lesser degree of heat which may still be effective in all of the boots.

The generators may also be provided to take care of a heavy overload so as to produce a much greater heating effect in an emergency by the connection of more of the heating elements in parallel, thus greatly reducing the resistance of the heating elements as they are connected to the generator, and permitting the same generator to produce the same voltage to increase its flow of current through the heating elements.

Of course, the amount of heat produced increases as the square of the current and the reduction of the resistance diminishes the heating effect only according to the first power of the resistance.

The operation of my de-icer is as follows: In the case of a de-icer, which relies only upon the heating effect, the thermocouple amplifier and indicating meter, calibrated in terms of temperature, would indicate at all times the temperature at the leading surfaces of the wings or other elements on which ice is expected to form.

As this temperature decreases to the dangerous point, the operator could by means of the manual control turn on the generators or connect the heating elements to them in such manner that they would be energized to heat up the leading surfaces where the heating elements are located, and counteract the cooling tendency of the air on these surfaces so as to increase the temperature above the freezing point and maintain it at a predetermined temperature above the freezing point.

In other cases the automatic control would automatically turn on the heating elements to be energized when the temperature dropped below a predetermined point, as determined by the thermocouple, which is controlling the automatic control.

In other cases the automatic control or manual control would also be adapted to control, through solenoids and air valves, the application of the intermittent air pressure to the boot so that the boot would be automatically distended and contracted, as shown in Figs. 2 and 3, and the heating arrangement of the boot may be used simultaneously with the application of air for distention and contraction.

The present arrangement of heating elements in the boot does not in any way detract from its capabilities as a de-icer by contraction and expansion of the boot walls; but, on the contrary, the heating elements heat the surface of the boot at the point where the ice is attached and cause a sufficient melting of the ice to detach it and to permit the boot to slide relative to the ice so that the ice is broken off and impelled to the rear of the plane by the air stream.

In many cases it would only be necessary to use the contracting and expanding feature of the boot, and the electric heating arrangement could be held in reserve for emergencies, or in any event the complete capacity of the electric heating arrangement need not be used in all cases, and there would be a reserve amount of heating power for producing a melting and detachment of the ice under all conditions.

Another advantage of the present ice-removing device is that, the heating elements being disposed in the outer movable layer of the rubber boot, the heat is effectively located at the exact point where it is needed to melt the ice forming on the boot and this heated portion of the boot is effectively heat-insulated from the rest of the boot and from the airplane by means of the air space which exists between the inner and outer layers of the boot.

Another way of operating the boot and utilizing heat alone is to fill the boot with dead air under predetermined pressure to form a dead air space and to maintain that pressure constant so as to use the air for heat insulation.

Another advantage of the present device for use on military aircraft is that although the expansible portion of the boot may be pierced by bullets and put out of commission due to leakage, this will not affect the operation of the heating equipment even though one or more of the heating elements may be severed by a piercing bullet.

Under these conditions, the rest of the heating elements would still be effective to supply heat and melt any ice formations that might appear. This would permit the returning craft to return to its base and to maintain a higher altitude in its return flight than would be possible if the ordinary de-icing devices of the prior art were used and which are so easily disabled by a piercing bullet.

The operational characteristics of the heating elements and the generators for supplying them with current, are preferably such that even though a considerable number of the heating elements are severed by bullets or other military action, the generator will continue to supply current to the other heating elements at the same voltage.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a detachable de-icing boot for airplanes, the combination of a pair of flexible walls joined together at their edges to form an expansible member with a plurality of heating elements located in the outermost of said walls adjacent the outer surface of said latter wall and extending transversely to the direction of its expansion, and means for attaching said boot to the leading surface of one of the pressure elements of an airplane.

2. In a detachable de-icing boot for airplanes, the combination of a pair of flexible walls joined together at their edges to form an expansible member with a plurality of heating elements located in the outermost of said walls adjacent the outer surface thereof, and means for attaching said boot to the leading surface of one of the pressure elements of an airplane, comprising a plurality of tubular rivets for securing said walls together adjacent their edges and for receiving threaded members adapted to be threaded into one of the frame members of said pressure element.

3. In a detachable de-icing boot for airplanes, the combination of a pair of flexible walls joined together at their edges to form an expansible member with a plurality of heating elements located in the outermost of said walls adjacent the outer surface thereof, and means for attaching said boot to the leading surface of one of the pressure elements of an airplane, said heating elements being arranged in sections, and switch means adapted to connect said sections selectively in series or parallel.

4. In a de-icing arrangement for an airplane, the combination of a pressure element of a plane having an airfoil surface which is provided with a recess for receiving a de-icer boot, said recess having overhanging skin flanges at its borders, with a de-icer boot comprising a pair of flexible walls of air-tight material secured together at their edges and adapted to be detachably secured to said pressure element in said recess, with its edges under said overhanging skin, the outermost of said flexible walls having a plurality of electric heating elements carried thereby adjacent the outer surface thereof to effect a melting of any ice which may form at its point of attachment.

5. In a de-icing arrangement for an airplane, the combination of a pressure element of a plane having an airfoil surface which is provided with a recess for receiving a de-icer boot, said recess having overhanging skin flanges at its borders, with a de-icer boot comprising a pair of flexible walls of air-tight material secured together at their edges and adapted to be detachably secured to said pressure element in said recess, with its edges under said overhanging skin, the outermost of said flexible walls having a plurality of electric heating elements carried thereby adjacent the outer surface thereof to effect a melting of any ice which may form at its point of attachment, the outermost of said flexible walls being formed of stretchable material adapted to stretch between the said electric heating elements to effect an expansion and contraction of the boot to break the detached ice from the boot.

6. In a de-icing arrangement for an airplane, the combination of a pressure element of a plane having an airfoil surface which is provided with a recess for receiving a de-icer boot, said recess having overhanging skin flanges at its borders, with a de-icer boot comprising a pair of flexible walls of air-tight material secured together at their edges and adapted to be detachably secured to said pressure element in said recess, with its edges under said overhanging skin, the outermost of said flexible walls having a plurality of electric heating elements carried thereby adjacent the outer surface thereof to effect a melting of any ice which may form at its point of attachment, the outermost of said flexible walls being formed of stretchable material adapted to stretch between the said electric heating elements to effect an expansion and contraction of the boot to break the detached ice from the boot, the said boot being provided with means for securing its expansible wall to its other wall at predetermined points to effect deformation as well as expansion of the boot by the application of gaseous pressure to its interior.

7. In a de-icing device for military aircraft, the combination of an expansible member adapted to be mounted on the leading surfaces of an airfoil to prevent the collection of ice and effect its melting and removal, said expansible member having an inner wall engaging the surface of the plane and having an outer wall of resilient flexible extensible material and having securing devices located at the juncture of the inner and outer walls, and a plurality of heating elements located in the outer wall and extending longitudinally of the airfoil surface, said heating elements being spaced from each other in the direction of the distention of the outer layer of said expansible member whereby the material between said heating elements may be distended, said heating elements being embedded in said outer wall and comprising a multiplicity of elements so that the severance of one or more elements in military action will still permit the effective operation of the balance of the heating elements, the air space between said outer and inner walls of said member serving as a heat insulator when said member is distended.

8. In a de-icer for airplanes, an expansible member adapted to be applied to the leading edge of an airfoil member and having its external surface heated, comprising a pair of flexible walls joined together at their edges to form an expansible member, the outermost of said flexible walls being of stretchable material, with a plurality of electrical heating elements located in the outermost of said walls adjacent the outer surface thereof, said heating elements being supported by said outer wall, and insulated from each other by being surrounded by portions of said outer wall, and means for attaching said de-icer to the leading surface of an airfoil element of an airplane whereby the electric heating elements may effect a melting of the ice deposited on the outer wall of said de-icer so that upon expansion or contraction of said de-icer the ice will be broken and blown off the said leading surface.

9. In a de-icer for airplanes, an expansible member adapted to be applied to the leading edge of an airfoil member and having its external surface heated, comprising a pair of flexible walls joined together at their edges to form an expansible member, the outermost of said flexible walls being of stretchable material, with a plurality of electrical heating elements located in the outermost of said walls adjacent the outer surface thereof, said heating elements being supported by said outer wall, and insulated from each other by being surrounded by portions of said outer wall, and means for attaching said de-icer to the leading surface of an airfoil element of an airplane whereby the electric heating elements may effect a melting of the ice deposited on the outer wall of said de-icer so that upon expansion or contraction of said de-icer the ice will be broken and blown off the said leading surface, the said flexible walls being joined together also at substantially the leading edge of the airfoil element to prevent expansion at that point whereby the ice is broken into upper and lower parts by expansion or contraction of the de-icer.

10. In a de-icer for airplanes, an expansible member adapted to be applied to the leading edge of an airfoil member and having its exterior surface heated, comprising a pair of flexible walls joined together at their edges to form an expansible member, the outermost of said flexible walls being of resilient stretchable material, with a plurality of electrical heating elements located in the outermost of said walls adjacent the outer surface thereof, said heating elements being supported by said outer wall and insulated from each other by being surrounded by portions of said outer wall, and said heating elements extending in a direction transversely to the direction in which the outer wall is to be stretched, and means for attaching the said de-icer to the leading surface of an airfoil element of an airplane whereby the electric heating elements may be energized to heat of the outer wall and any ice or fluid attached to or engaging it while the expansion or contraction of the said outer wall of said de-icer changes the shape and size of said outer wall so that ice will be broken and removed from the outer wall and there will be a tendency to prevent the formation of any ice on said outer wall.

11. In a de-icer for airplanes, an expansible member adapted to be applied to the leading edge of an airfoil member and having its exterior surface heated, comprising a pair of flexible walls joined together at their edges to form an expansible member, the outermost of said flexible walls being of resilient stretchable material, with a plurality of electrical heating elements located in the outermost of said walls adjacent the outer surface thereof, said heating elements being supported by said outer wall and insulated from each other by being surrounded by portions of said outer wall, and said heating elements extending in a direction transversely to the direction in which the outer wall is to be stretched, and means for attaching the said de-icer to the leading surface of an airfoil element of an airplane whereby the electric heating elements may be energized to heat of the outer wall and any ice or fluid attached to or engaging it while the expansion or contraction of the said outer wall of said de-icer changes the shape and size of said outer wall so that ice will be broken and removed from the outer wall and there will be a tendency to prevent the formation of any ice on said outer wall, the said de-icer being curved over the leading edge of said airfoil member and extending backwardly from said leading edge on both sides of the airfoil member, and the said heating elements extending longitudinally of the airfoil member on its curved edge whereby expansion may take place in the outer wall between the heating elements.

DAVID C. HUBBARD.